US012707522B2

(12) United States Patent
Sharma et al.

(10) Patent No.: US 12,707,522 B2
(45) Date of Patent: Aug. 11, 2026

(54) RESTORING USER DATA REPOSITORY CONNECTIONS USING DESIGNATED ATTEMPT INITIATORS AND RECIPIENTS

(71) Applicant: T-Mobile USA, Inc., Bellevue, WA (US)

(72) Inventors: Anuj Sharma, Broadlands, VA (US); Deepesh Belwal, Ashburn, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 309 days.

(21) Appl. No.: 18/635,997

(22) Filed: Apr. 15, 2024

(65) Prior Publication Data

US 2025/0324477 A1 Oct. 16, 2025

(51) Int. Cl.
*H04W 76/19* (2018.01)
*H04W 76/18* (2018.01)

(52) U.S. Cl.
CPC .......... *H04W 76/18* (2018.02); *H04W 76/19* (2018.02)

(58) Field of Classification Search
CPC .............................. H04W 76/18; H04W 76/19
See application file for complete search history.

(56) References Cited

U.S. PATENT DOCUMENTS

2022/0303753 A1* 9/2022 Zhu .......................... H04W 8/08
2022/0329649 A1* 10/2022 Feng ........................ H04L 67/51
2023/0048268 A1* 2/2023 Zhao ...................... H04W 12/06
2023/0379845 A1* 11/2023 Krishan .............. H04W 56/001
2024/0022908 A1* 1/2024 Baskaran ............ H04W 12/069
2025/0220772 A1* 7/2025 Moon ................... H04W 48/18

* cited by examiner

*Primary Examiner* — Dai Phuong
(74) *Attorney, Agent, or Firm* — Lee & Hayes, P.C.

(57) ABSTRACT

System and methods for reestablishing communication connections between nodes of a user data repository (UDR) are described. For purposes of reestablishing previously established communication connections between nodes of the UDR, a portion of the nodes are designated as "attempt initiator" nodes that attempt to reestablish communication connections when conditions of the UDR permit the attempt. The nodes designated as attempt initiator nodes attempt to reconnect with nodes of the UDR designated as "attempt recipient" nodes, which are passive nodes that wait for communication attempts from one or more attempt initiator nodes.

20 Claims, 4 Drawing Sheets

RESTORING USER DATA REPOSITORY CONNECTIONS USING DESIGNATED ATTEMPT INITIATORS AND RECIPIENTS

BACKGROUND

A user data repository (UDR) data structure may be used to store various data about subscribers to a network. The information can be used by a network to determine what services may be used by a mobile device associated with a user as well as other aspects. Core data, such as subscription profile details, policies, and authentication/authorization data can be stored on a storage (or backend) layer. Indexes to that core data, such as an international mobile subscriber identity (IMSI), a mobile subscriber ISDN (MSISDN), a subscription permanent identifier (SUPI), a subscription concealed identifier (SUCI), an integrated circuit card identification number (ICCID) for a SIM, and the like, can be stored in an access (or front end) layer. Convention UDR systems used by a network typically use nodes that store the various data. In order to provide services for the subscriber (user) base, the nodes are in communication with each other so that subscriber data can be determined regardless of what front end node is accessed by the network.

When communication connections are lost between one or more nodes, the process executed by the nodes of the UDR in attempting to reestablish those communication connections can delay or inhibit a recovery of those network functions.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
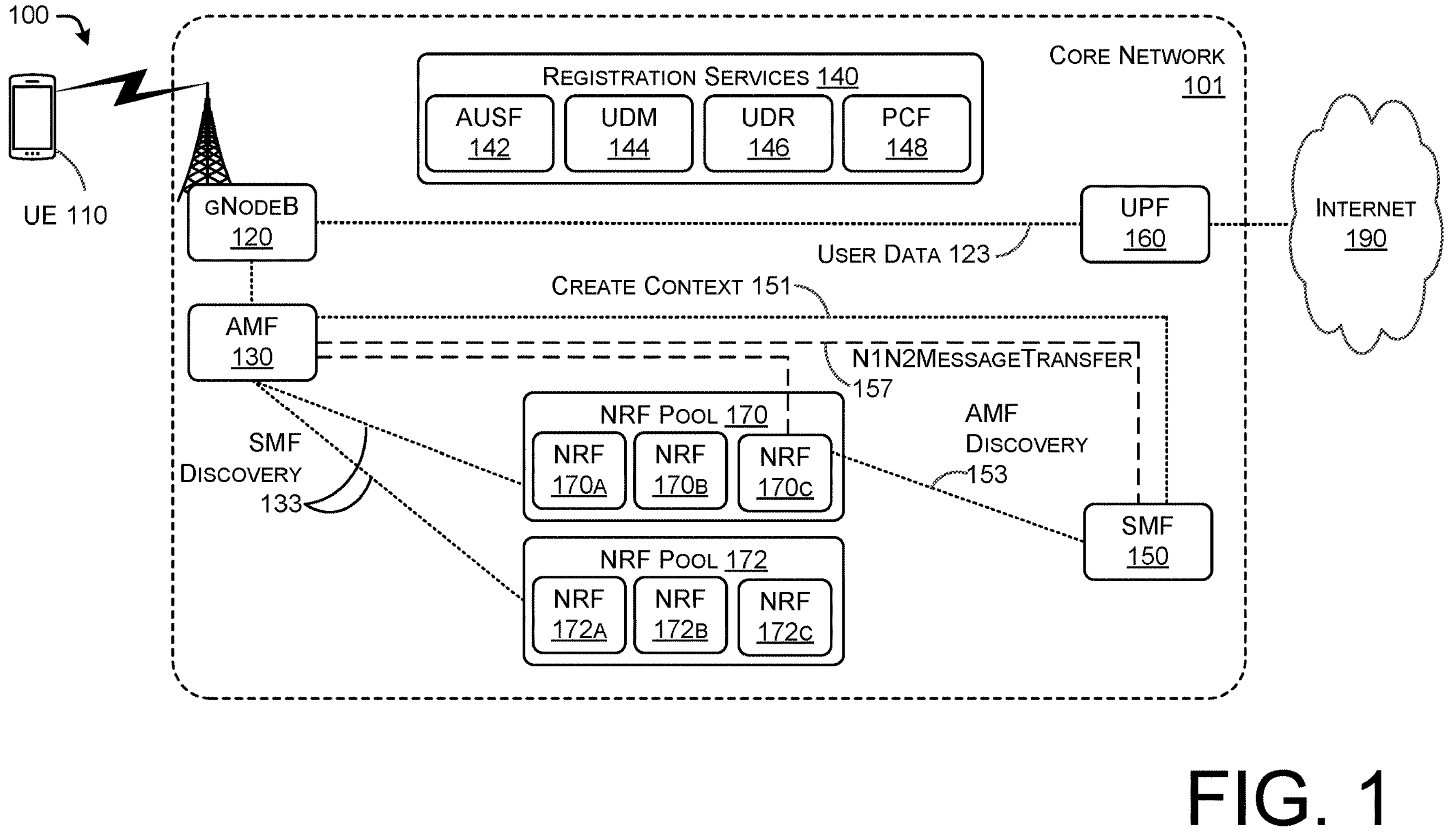
FIG. 1 is a schematic diagram of an illustrative wireless communication network environment in which systems and techniques for restoring user data repository communication connections using attempt initiator and attempt receiver nodes may be implemented, in accordance with examples of the disclosure.

It should be understood that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. This disclosure is directed in part to systems and techniques for restoring communication connections in a user data repository (UDR) in wireless communications networks and other networks that perform wireless device registration and resource provisioning. Such networks include any networks that may facilitate wireless communications services for one or more wireless communications devices. Such networks include networks that support one or more 3GPP standards, including, but not limited to, Long Term Evolution (LTE) networks (e.g., 4G LTE networks) and New Radio (NR) networks (e.g., 5G NR networks). However, the disclosed systems and techniques may be applicable in any network or system in which a user device may request and receive access to communicate with one or more network and/or remote devices using any protocol.

As discussed above, telecommunications networks rely on user data repository databases for subscriber information. Conventional UDRs deployed for wireless subscription storage are deployed using a front end access (FE)/back end storage (BE) model. Information such as, but not limited to, subscription profile details profile/policy/authentication/authorization data can be stored on the storage (BE) layer, while various indexes to access that data, such as an international mobile subscriber identity (IMSI), a mobile subscriber ISDN (MSISDN), a subscription permanent identifier (SUPI), a subscription concealed identifier (SUCI), an integrated circuit card identification number (ICCID) for a SIM, and the like, can be stored in the access (FE) layer. For various reasons, the information stored in the FE and/or BE layers can be distributed and decentralized geographically and communicatively across the network.

Storing subscriber information in a UDR format allows the network to decentralize data while allowing enterprise-wide access to that data. However, in order to provide enterprise-wide access, a front end will need to be able to communicatively connect to a back end that may have stored therein subscriber information needed by the front end to facilitate a connection between mobile devices or applications. In some instances, a front end at one communication site or specific UDR virtual network function (VNF), in a default or operational condition, may have connectivity to other front ends and back ends in other VNFs (hereinafter, a "front end" or a "back end" may be referred to generically as a "node"). As used herein, an "operational condition" is a condition of the wireless communications network whereby all the nodes of a user data repository are in full communication. When in "full communication," every node in one pod is communicatively connected to every other node in its pod and other pods in the user data repository. When communication connections are lost and then restored for one or more of these connections, the nodes associated with one or more of these VNFs may attempt to reconnect to previously connected nodes in other VNFs. For example, node 1 of VNF 1 may have been previously connected to node 2 of VNF 2. When a previously established communication connection has been lost and then restored, in conventional UDRs, node 1 will attempt to reestablish communications with node 2, and contemporaneously, node 2 will attempt to reestablish communications with node 1. Thus, in a conventional network, the network will be servicing two connection attempts for one connection, placing a burden on network capabilities during a recovery period. The issue can be exacerbated when the dual reconnection attempts are occurring between VNFs, as those communication connections often require more resources than communication connections within the VNF itself. In some instances, during a partial or full network communication recovery operation, the tax on network resources using conventional methods can slow down or even halt the recovery.

Thus, to alleviate the use of network resources, various examples of the presently disclosed subject matter use a recovery method whereby node connectivity is first restored within the VNF and then connectivity is restored between nodes across VNFs. However, in some examples of the presently disclosed subject matter, nodes are designated as either attempt initiators or attempt recipients. As used herein, an "attempt initiator" is a node that during a recovery attempt attempts a connection initiation and an "attempt recipient" is a node that during the recovery attempt wait to receive a connection attempt. For example, where node 1 of VNF 1 may have been previously connected to node 2 of VNF 2, the node 1 may be designated as an attempt initiator and node 2 may be designated as an attempt recipient. When a previously established communication connection has been lost and then restored, node 1, as an attempt initiator, will attempt to reestablish the communication connection with node 2. Because node 2 is designated as an attempt recipient, instead of node 2 also attempting to reestablish communication connections like in conventional networks, node 2 will remain passive and wait for an attempt initiator, such as the node 1, to attempt to reestablish a connection.

However, in some examples, because node 1 and node 2 are in different VNFs, node 1 and node 2 will reconnect with other nodes within each of their respective VNFs prior to attempting to reconnect with other nodes outside of their respective VNFs. For example, node 1 may be associated with a VNF 1 along with node 3, node, 4, and node 5, whereas node 2 may be associated with a VNF 2. During a network outage, node 1 may have lost a connection to nodes 3 and 4 in VNF 1 and node 2 in VNF 2. In some examples, nodes 3 and 4 in VNF 1 may be designated as attempt recipients or attempt initiators. However, in some examples, the designation as an attempt recipient or attempt initiator may be limited to VNF-to-VNF connections. Thus, in some examples, within a VNF, the nodes may each attempt to reconnect with each other. In this example, nodes 1, 3, and 4 in VNF 1 attempt to reconnect. Once previously established connections are restored within the VNF 1, the nodes in VNF attempt to reestablish connections with nodes in other VNFs according to their designation as either an attempt recipient or attempt initiator.

Illustrative environments, signal flows, and techniques for implementing systems and methods for restoring communication connections in a user data repository (UDR) are described below. However, the described systems and techniques may be implemented in other environments.

Illustrative System Architecture

FIG. 1 is a schematic diagram of an illustrative wireless network environment 100 in which the disclosed systems and techniques may be implemented, in accordance with examples of the disclosure. The environment 100 may include a UE 110 that may wirelessly communicate with an gNodeB 120. While referred to as an "gNodeBs" for explanatory purpose herein, the gNodeB 120 may be any type of base station, including, but not limited to, any type of BTS, NodeB, eNodeB, gNodeB, etc. The gNodeB 120 may communicate with other components and functions in a core network 101. The core network 101 may be any one or more networks that facilitate communications between particular devices, components, and/or functions of various types in the core of a wireless communications network that may facilitate communication between computing device and/or mobile devices (e.g. UEs). Various connections between components and functions in the core network 101 may be wired, wireless, or a combination thereof. The components and functions described herein may be implemented as physical devices, as software components executing on one or more computing devices, any combination thereof. In various embodiments, the core network 101 may facilitate the establishment of communications sessions for one or more wireless devices, such as UE 110. In examples, the core network 101 may facilitate authorized packet-based communications between such wireless devices and other wireless devices, devices on the Internet, one or more IP multimedia subsystems (IMSs), and/or one or more other data networks (DNs).

In FIG. 1, connections between components may be logical connections indicated by dashed lines. These logical connections may also be facilitated by one or more wired and/or wireless connections and may include traversal of one or more devices, components, and/or functions (not shown in FIG. 1). In environment 100, the UE 110 may communicate with the gNodeB 120 to request the establishment of a PDU session, such as to communicate with one or more systems at an Internet 190. The gNodeB 120 may relay the request or otherwise transmit a request for the establishment of the PDU session to an AMF 130. In various examples, an AMF may interact with an SMF to allocate the resources required to establish PDU sessions for UEs. Such interactions may include authenticating and authorizing a user and/or user device (e.g., UE), creating contexts for such sessions, determining and applying session policies, establishing user plane resources, etc. Therefore, the AMF 130, based on receiving this request for the establishment of a PDU session on behalf of the UE 110, may query one or more of the NRF pools 170 and 172 for an address (e.g., IP address) for an SMF with which it may interact to establish the requested PDU session.

In examples, the AMF 130 may exchange SMF discovery communications 133 with one or more of NRFs 170*a-c* of NRF pool 170 or NRFs 172*a-c* of NRF pool 172. As described herein, a wireless communications network may be configured with one or more NRF pools, each of which may include one or more NRFs. In this discovery communication 133, the AMF 130 may provide an identifier of one or more particular SMFs with which it may wish to interact, or it may request an SMF address generally. The AMF 130 may or may not specify in the communication 133 a particular service for which the AMF 130 is requesting an address.

In some examples, NRF pools such as pools 170 and 172 may be geographically located and configured to provide repository function services to functions and components that are relatively geographically proximate to the pool. In such examples, there may be one or more pools provided for a particular geographical area or region. The NRFs within each pool may be configured to have synchronized address information for the various devices represented in each NRF. The AMF 130 may receive an address for an SMF 150 from one of NRFs 170*a-c* of NRF pool 170 or NRFs 172*a-c* of NRF pool 172. The AMF 130 may then initiate PDU session establishment communications, such as create context communications 151, with SMF 150. Note that the AMF 130 may be configured with multiple addresses and may use a first of such addresses in this example for the communications 151. The SMF 150 may perform various PDU session establishment operations, in some examples interacting with one or more other components and/or functions. For example, the SMF 150 may interact with one or more of the registration services 140, which may include any one more of an authentication server function (AUSF) 142, a unified data management (UDM) 144, a user data repository (UDR) 146, and a policy control function (PCF) 148 (operations not shown in FIG. 1). In various examples, the SMF 150 may also communicate with the AMF 130 via communications 151, for example, to acknowledge receipt of a context creation request, to indicate that the requested context for the PDU session has been successfully created, to indicate that creation of the requested context has failed, etc. In the communications 151, the SMF 150 may use the address associated with the AMF 130 that the AMF used to initiate the communications 151.

Beyond context creation, the SMF may perform one or more other operations to complete establishing the PDU session for the UE 110. For example, the SMF 150 may determine or otherwise perform operations to generate information that the UE 110 and/or the gNodeB 120 may use to facilitate packet communications with other devices using the PDU session. Such information may include tunnel information, quality of service (QoS) information, session identifier(s), security information, and/or any other information needed by a UE and/or a gNodeB to use a PDU session for packet communications with one or more other devices and/or DNs. This information may be referred to herein generally as message transfer data, or in specific 5G examples, as N1N2MessageTransfer data.

To convey message transfer data to the AMF 130, the SMF 150 may use a separate and distinct communications sessions than communications 151, which may be dedicated to context creation communications. For example, the SMF 150 may establish N1N2MessageTransfer communications 157 for providing message transfer data to the AMF 130. In order to determine an address for the AMF 130 to use with communications 157, the SMF 150 may query one of NRFs 170*a-c* of NRF pool 170 or NRFs 172*a-c* of NRF pool 172. The SMF 150 may exchange AMF discovery communications 153 with one or more of these NRFs. In this discovery communication 153, the SMF 150 may provide an identifier of the AMF 130 (e.g., received during communication 151 and/or as configured at the SMF 150). The SMF 150 may or may not specify in the communication 153 a particular service for which the SMF 150 is requesting an address.

The queried NRF may respond via the discovery communications 153 with an address for the AMF 130. In some examples, this may be the first address that was used in communication 151. In other examples, this may be another address for the AMF 130 with which the SMF 150 is able to successfully communicate. In such examples, the SMF 150 may the use the provided address for the AMF 130 to establish the N1N2MessageTransfer communications 157 and provide message transfer data for the requested PDU session to the AMF 130. The AMF 130 may then provide this information to the gNodeB 120 (that may provide some or all of such information to the UE 110). Using this information, the UE 110 may, via the gNodeB 120, exchange user data 123 with the devices and/or DNs (e.g., the Internet 190) via a user plane function (UPF) 160.

As noted above, the UDR 146 may have stored therein subscriber information relating to the UE 110. The UDR 146 may be comprised of one or more pods of front end nodes and back end nodes. As used herein, a "pod" includes a VNF described above as well as a collection of front end nodes and back end nodes designated by the network as an operational unit. For example, a pod may be one or more front end nodes and back end nodes geographically located proximate to the gNodeB 120. In another example, a pod may be one or more front end nodes and back end nodes associated with a specific virtual network function (VNF). It should be noted that a "pod" may also be comprised of one or more pods. Thus, a pod of the UDR 146 may be a subset of datastores that collectively form the UDR 146. The pods of the UDR 146 may include "attempt initiator" nodes and "attempt recipient" nodes to assist in connection recovery efforts, explained in more detail in FIG. 2, below.

Figure 2:
FIG. 2 is an illustration of a user data repository with attempt initiator and attempt receiver nodes, in accordance with examples of the disclosure.
Figure 2:
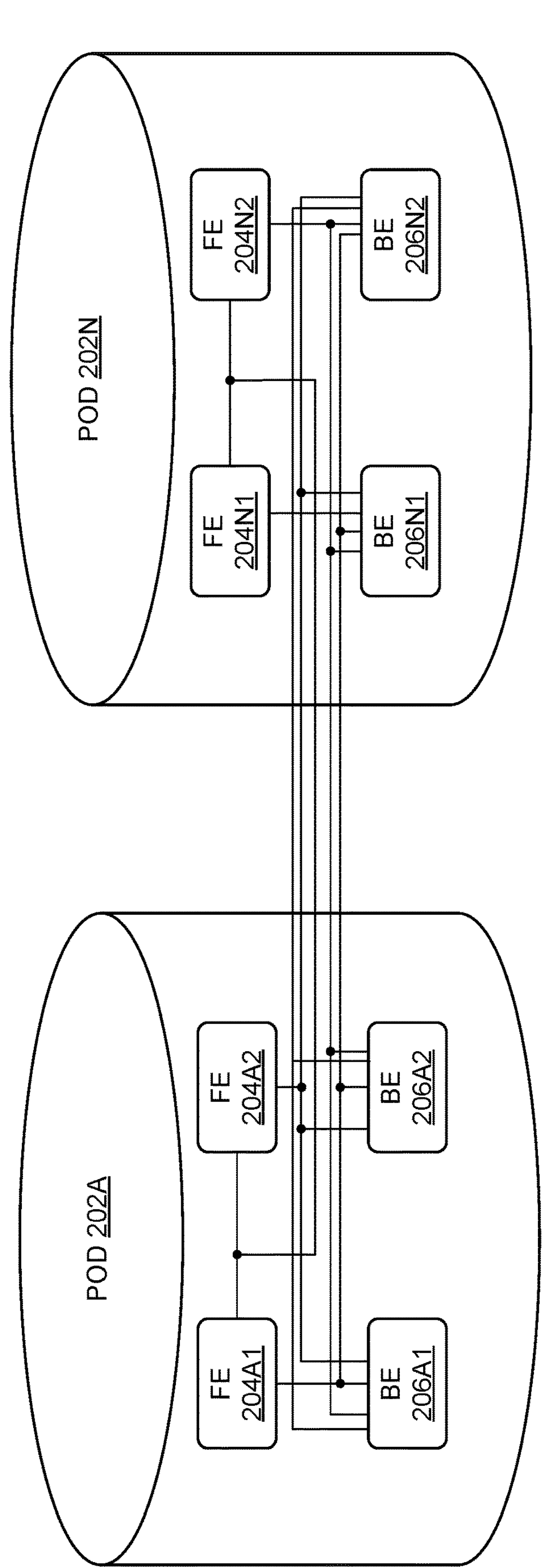

FIG. 2 is an illustration of the UDR 146 configured with "attempt initiator" nodes and "attempt recipient" nodes, in accordance with various examples of the disclosure. The UDR 146 includes pod 202A and pod 202N (hereinafter individually referred to as "the pod 202A" and "the pod 202N," and collectively as "the pods 202"). The pods 202 are group of nodes that are associated with each other by the network 101. The pods 202 can be distributed geographically and/or logically depending on the network 101. For example, the pod 202A may have nodes located proximate to a geographical area near the gNodeB 120. In another example, the pod 202N may be a virtual network function (VNF) having nodes associated with certain functions. The presently disclosed subject matter is not limited to any particular purpose by which the datastores in the pods 202 are associated.

The pods 202 include front end nodes and back end nodes. For example, the pod 202A includes front end nodes 204A1 and 204A2, whereas the pod 202N includes front end nodes 204N1 and 204N2. Similarly, the pod 202A includes back end nodes 206A1 and 206A2, whereas the pod 202N includes back end nodes 206N1 and 206N2. As mentioned above, a back end node typically has stored thereon subscription profile details such as, but not limited to, a user profile, a policy associated with the user, and authentication/authorization data. A front end node typically has stored thereon indexes to access the data on back end nodes such as, but not limited to, international mobile subscriber identity (IMSI), a mobile subscriber ISDN (MSISDN), a subscription permanent identifier (SUPI), a subscription concealed identifier (SUCI), an integrated circuit card identification number (ICCID) for a SIM, and the like.

Because information relating to a particular subscriber attempting to use the network 101 may not be stored on a particular node, each of the nodes in FIG. 2 are connected to the other nodes so that, even if information relating to a subscriber is not located on the node receiving the connection request from the network 101, the node is able to access the other nodes and obtain that data. For example, as illustrated in FIG. 2, the front end node 204N1 is communicatively connected to the front end nodes 204N2 in the pod 202N, as well as, the front end nodes 204A1 and 204A2 of the pod 202A. In another example, the back end node 206A1 is communicatively connected to the back end nodes 206A2, 206N1, and 206N2. In this manner, even if a node accessed by the network 101 does not have subscriber data of the mobile device being used, the accessed node can communicate with the other nodes to retrieve that information. For example, user data for the UE 110 is stored on the back end node 206N2 and the index to that user data is stored on the front end node 204A2. If the front end node 204A1 is accessed by the network 101, the front end node 204A1 can communicate with the other front end nodes 204 to retrieve the index data for the user of the UE 110, which in this example is the front end node 204A2. Further, the front end node 204A1 can communicate with the back end nodes 206 using the index data retrieved from the front end node 204A2 to access core data associated with the user, which in this example is stored on back end node 206N2.

According to various examples described herein, various front end nodes and back end nodes are designated as either an "attempt initiator" node or an "attempt recipient" node. In this example, if a node is an "attempt initiator" node, the node, upon receiving information that a connection can be reestablished, will attempt to reconnect to another node to reestablish a prior connection. Ifa node is an "attempt recipient" node, the node will remain passive and wait for an attempt initiator node to reconnect and reestablish a prior connection. For example, the front end nodes 204A1 and 204N1 and the back end node 206N2 may be designated as "attempt initiator" nodes, whereas, the front end nodes 204A2 and 204N2 and the back end nodes 206A1, 206A2, and 206N1 may be designated as "attempt recipient" nodes. The designation may applied for various reasons. For example, one or more of the nodes may have their designation for any reconnection attempt, irrespective of the particular connection to any other node. In another example, the designation may be applied based on the connection. In this example, the front end node 204A1 may be an attempt initiator for the connection between the front end node 204A1 and the front end node 204A2 and an attempt recipient for the connection between the front end node 204A1 and the front end node 204N1. In another example, the designation may be applied based on a percentage of the total connections or the number of connections restored. For example, the total number of connections in FIG. 2 is 28. The network 101 may determine that after a certain number or percentage of the connections have been restored, it is acceptable for all remaining nodes to attempt to initiate connections. For example, the network 101 may determine that after seventy five percent (75%), or 21, of the connections have been reestablished, all nodes having an attempt recipient designation may be redesignated as an attempt initiators. Thus, while a node may be an attempt initiator or attempt recipient in one context, the same node may be designated or redesignated as the other type of node in another context. In addition, the redesignation condition may be a predetermined length elapsed from the initiation of the communication reconnection attempts. For example, the length of elapsed time may be five (5) minutes, whereby after five minutes, one or more of the nodes previously designated as attempt recipients are redesignated as attempt initiators.

Figure 3:
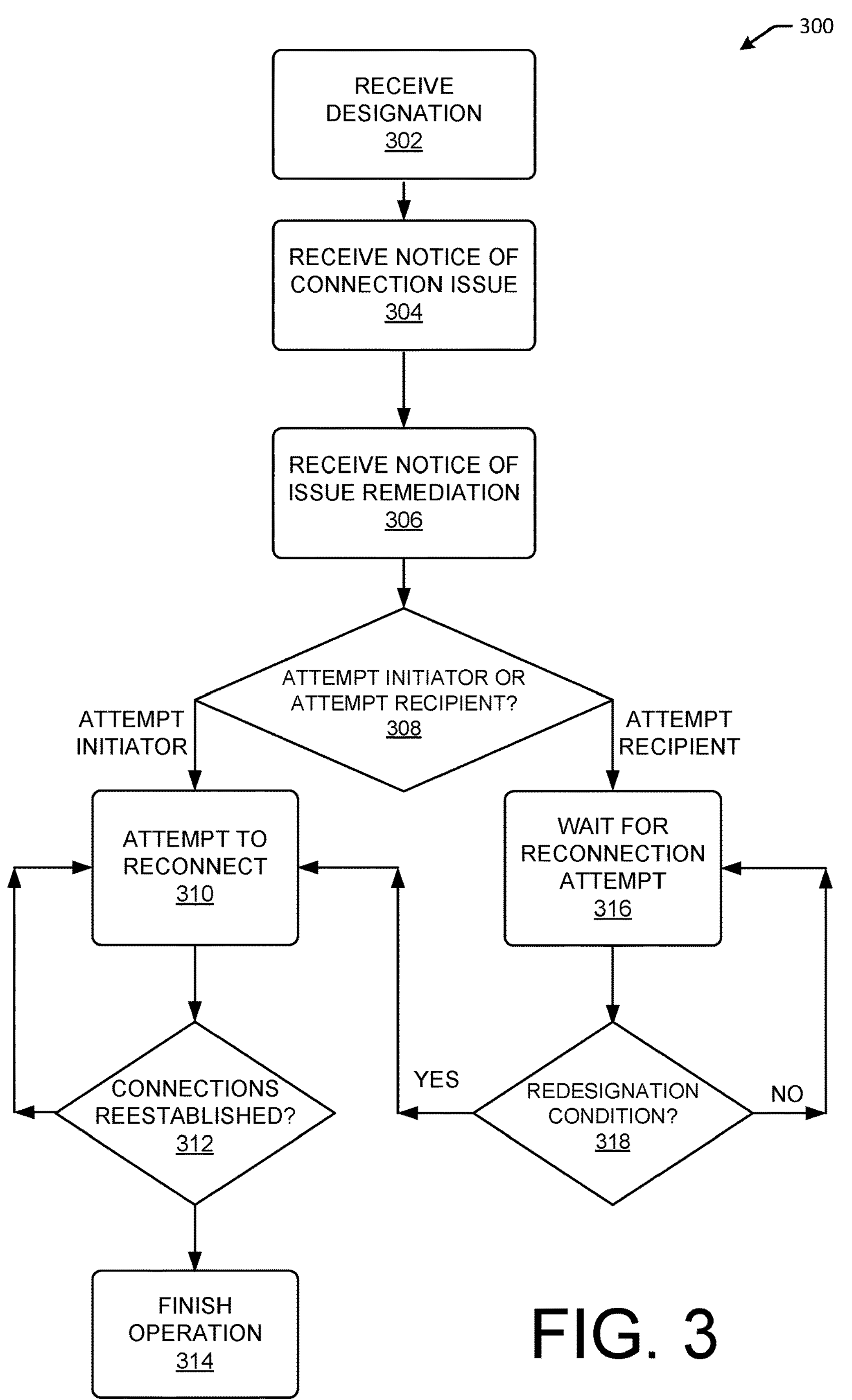
FIG. 3 is a flow diagram of an illustrative process restoring user data repository communication connections using attempt initiator and attempt receiver nodes, in accordance with examples of the disclosure.

FIG. 3 shows a flow diagram of an illustrative process 300 for restoring user data repository communication connections using designated attempt initiators and recipients, according to examples of the presently disclosed subject matter. The process 300 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 300 may be described with reference to the wireless network environment 100 of FIG. 1, however other environments may also be used.

At block 302, a designation for a node is received at the node, at the network 101, or other components of the network 101. The designation may be an "attempt recipient" or an "attempt initiator." As discussed above, when previously established connections may be reconnected, an attempt initiator node may attempt to reestablish the connection and an attempt recipient may wait to receive a reconnection attempt from an attempt initiator. Further, as discussed above in FIG. 2, a node may be designated as an attempt initiator in one context (or condition) and an attempt recipient in another context (or condition). In some examples, if the node itself controls and executes the reconnection attempt, the node may have stored thereon and be configured as one of the designations. In other examples, if an external component or module other than the node controls and/or executes the reconnection attempt (such as a network server), the network server may have stored thereon the designations for the nodes that are controlled by the network server.

At block 304, the network 101 and/or the nodes of the UDR 146 may receive a notification of lost communication connections, or a fault condition. The lost communication connections may be due to reasons such as a physical disconnection (such as a damaged communication line) and/or a lost data connection, both of which may be termed a "fault" condition.

At block 306, a notice of issue remediation for the issue received at block 304 may be received at the network 101 and/or the nodes of the UDR 146. The issue remediation notice may indicate to the one or more nodes that have experienced communication disconnections that conditions have been established that a reconnection attempt may be successful.

At block 308, a determination is made as to whether or not the node is an attempt initiator or an attempt recipient. If at block 308 the determination is that the node is an attempt initiator, at block 310, the node commences to reestablish previously lost connections. As discussed above, in some examples, the operations of block 310 may be performed within the pod first and then outside the pod. For example, the front end node 204A1 may be designated as an attempt initiator and had previous connections to the front end node 204A1 and back end nodes 206A1 and 206A2, which have been designated as attempt recipients. In this example, prior to attempts to reconnect to nodes in the pod 202N, the front end node 204A1 may attempt to reconnect with the other nodes in the pod 202A, i.e., the front end node 204A1 and back end nodes 206A1 and 206A2. Once the connections have been reestablished in the pod 202A, the front end node 204A1 may thereafter attempt to reestablish connections with the nodes in the pod 202N that are designated as attempt recipients.

At block 312, a determination is made as to whether or not all communications have been reconnected. In some examples, a node or another module of the network 101 may have stored thereon a list of all connections of a node. If at block 312 it is determined that all connections listed in the list of connections have been reestablished, at block 314, the reconnection process is finished. If at block 312 it is determined that not all connections listed in the list of connections have been reestablished, the process 300 continues at block 310.

Returning to block 308, a determination is made as to whether or not the node is an attempt initiator or an attempt recipient. If at block 308 the determination is that the node is an attempt recipient, the process 300 continues at block 316, whereby the node waits for a connection attempt to be made by one or more attempt initiators.

If the node is configured to have the node designation change from an attempt recipient to an attempt initiator, the process 300 continues at block 318. If the node is not configured to have the node designation change from an attempt recipient to an attempt initiator, the process 300 continues at block 316.

At block 318, the network 101 determines if a redesignation condition exists to change the designation of the node from an attempt recipient to an attempt initiator. As discussed in FIG. 2, for example, a condition may be a number or percentage of reconnections established. After the condition is established, the node may be redesignated from an attempt recipient to an attempt initiator. Thus, while a node may be an attempt initiator or attempt recipient in one context, the same node may be designated or redesignated as the other type of node in another context. It should be understood that while a redesignation is discussed in terms of a node being redesignated from an attempt recipient to an attempt initiator, an attempt initiator may also be redesignated under various conditions. For example, during the process 300, if the network 101 determines that a number of nodes above a predetermined number are attempting reconnections as attempt initiators, the network 101 may redesignate one or more of the nodes as attempt recipients.

If at block 318 it is determined that the node is to be redesignated, the process 300 continues at block 310 where the node, now redesignated as an attempt initiator, attempts to reconnect with previous formed connections. The process 300 thereafter continues in the manner described above.

Figure 4:
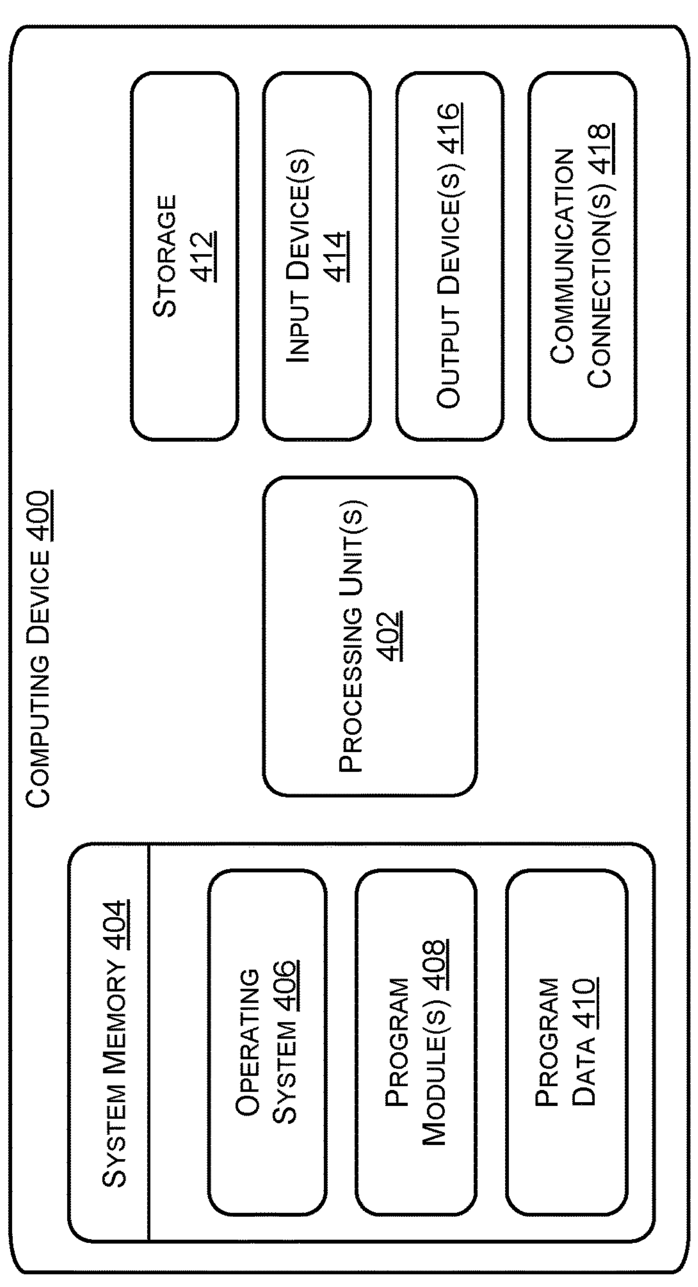
FIG. 4 is a schematic diagram of illustrative components in an example computing device that is configured for restoring user data repository communication connections using attempt initiator and attempt receiver nodes, in accordance with examples of the disclosure.
Figure 4:

FIG. 4 is an example of a computing device 400 for use with the systems and methods disclosed herein, in accordance with some examples of the present disclosure. For example, the computing device 400 may be a component or module installed on the front end nodes 204 and backend nodes 206 of FIG. 2 that perform one or more of the processes or functions described herein, including the process 300 of FIG. 3. In another example, the computing device 400 may be a component or module separate from the front end nodes 204 and backend nodes 206 of FIG. 2 that control reconnection operations for one or more nodes, including the execution of one or more blocks described with regard to the process 300 of FIG. 3. The computing device 400 can be used separate from or in conjunction with other components of the network 101 to implement various components of a core network, a base station, and/or any servers, routers, gateways, gateway elements, administrative components, etc. that can be used by a communication provider. One or more computing devices 400 can be used to implement the network 101, for example. One or more computing devices 400 can also be used to implement base stations, the front end nodes 204, the backend nodes 206, and other components.

In various embodiments, the computing device 400 can include one or more processing units 402 and system memory 404. Depending on the exact configuration and type of computing device, the system memory 404 can be volatile (such as RAM), non-volatile (such as ROM, flash memory, etc.) or some combination of the two. The system memory 404 can include an operating system 406, one or more program modules 408, and can include program data 410. The system memory 404 may be secure storage or at least a portion of the system memory 404 can include secure storage. The secure storage can prevent unauthorized access to data stored in the secure storage. For example, data stored in the secure storage can be encrypted or accessed via a security key and/or password. The program modules can include instructions to execute one or more blocks described in FIG. 3, and the operations/functions described in FIGS. 1 and 2. The computing device 400 can also include additional data storage devices (removable and/or non-removable) such as, for example, magnetic disks, optical disks, or tape. Such additional storage is illustrated in FIG. 4 by storage 412.

Non-transitory computer storage media of the computing device 400 can include volatile and nonvolatile, removable and non-removable media implemented in any method or technology for storage of information, such as computer readable instructions, data structures, program modules, or other data. The system memory 404 and storage 412 are examples of computer readable storage media. Non-transitory computer readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information, and which can be accessed by computing device 400. Any such non-transitory computer readable storage media can be part of the computing device 400.

In various embodiments, any or all of the system memory 404 and storage 412 can store programming instructions which, when executed, implement some or all of the functionality described above as being implemented by one or more systems configured in the environment 100 and/or components of the network 101.

The computing device 400 can also have one or more input devices 414 such as a keyboard, a mouse, a touch-sensitive display, voice input device, etc. The computing device 400 can also have one or more output devices 416 such as a display, speakers, a printer, etc. can also be included. The computing device 400 can also contain one or more communication connections 418 that allow the device to communicate with other computing devices using wired and/or wireless communications using transceivers.

Example Clauses

The following paragraphs describe various examples. Any of the examples in this section may be used with any other of the examples in this section and/or any of the other examples or embodiments described herein.

Clause 1. A method performed by one or more computing devices configured in a wireless communications network, the method comprising: designating, in a first pod of a user data repository (UDR) of the wireless communications network, first nodes of the first pod as attempt initiators and second nodes of the first pod as attempt receivers; designating, in a second pod of the UDR, first nodes of the second pod as attempt initiators and second nodes of the second pod as attempt receivers, wherein the first nodes of the first pod, the second nodes of the first pod, the first nodes of the second pod, and the second nodes of the second pod are in full communication; receiving, at the UDR, a fault condition indicating lost communication connections of a plurality of the first nodes of the first pod, a plurality of the second nodes of the first pod, a plurality of the first nodes of the second pod, and a plurality of the second nodes of the second pod; initiating, by the first nodes of the first pod, communication reconnection attempts with the second nodes of the first pod in which a communication connection was lost during the fault condition; and initiating, by the first nodes of the second pod, communication reconnection attempts with the second nodes of the second pod in which a communication connection was lost during the fault condition.

Clause 2. The method of clause 1, further comprising: upon the first nodes of the first pod reestablishing communications with the second nodes of the first pod in which a communication connection was lost and the first nodes of the second pod reestablishing communications with the second nodes of the second pod in which a communication connection was lost during the fault condition: initiating, by the first nodes of the first pod, communication reconnection attempts with the second nodes of the second pod in which a communication connection was lost during the fault condition; and initiating, by the first nodes of the second pod, communication reconnection attempts with the second nodes of the first pod in which a communication connection was lost during the fault condition.

Clause 3. The method of clause 1, further comprising receiving a redesignation condition whereby at least one of the second nodes of the first pod or at least one of the second nodes of the second pod are redesignated from an attempt recipient to an attempt initiator.

Clause 4. The method of clause 3, further comprising initiating, by the at least one of the second nodes of the first pod or the at least one of the second nodes of the second pod redesignated from an attempt recipient to an attempt initiator, communication reconnection attempts with the second nodes of the first pod or the second nodes of the second pod in which a communication connection was lost.

Clause 5. The method of clause 3, wherein the redesignation condition comprises a percent of communication connections between the first nodes of the first pod, the second nodes of the first pod, the first nodes of the second pod, and the second nodes of the second pod have been reestablished.

Clause 6. The method of clause 3, wherein the redesignation condition comprises a number of communication connections between the first nodes of the first pod, the second nodes of the first pod, the first nodes of the second pod, and the second nodes of the second pod have been reestablished.

Clause 7. The method of clause 3, wherein the redesignation condition comprises an elapsed period of time from a commencement of communication reconnection attempts between the first nodes of the first pod, the second nodes of the first pod, the first nodes of the second pod, or the second nodes of the second pod.

Clause 8. The method of clause 1, wherein the first pod or the second pod comprises a virtual network function (VNF).

Clause 9. A network computing device configured at a wireless communications network, the network computing device comprising: one or more processors; one or more transceivers; and non-transitory computer-readable media storing computer-executable instructions that, when executed by the one or more processors, cause the one or more processors to perform operations comprising: designating, in a first pod of a user data repository (UDR) of the wireless communications network, first nodes of the first pod as attempt initiators and second nodes of the first pod as attempt receivers; designating, in a second pod of the UDR, first nodes of the second pod as attempt initiators and second nodes of the second pod as attempt receivers, wherein the first nodes of the first pod, the second nodes of the first pod, the first nodes of the second pod, and the second nodes of the second pod are in full communication; receiving, at the UDR, a fault condition indicating lost communication connections of a plurality of the first nodes of the first pod, a plurality of the second nodes of the first pod, a plurality of the first nodes of the second pod, and a plurality of the second nodes of the second pod; initiating, by the first nodes of the first pod, communication reconnection attempts with the second nodes of the first pod in which a communication connection was lost during the fault condition; initiating, by the first nodes of the second pod, communication reconnection attempts with the second nodes of the second pod in which a communication connection was lost during the fault condition; and upon the first nodes of the first pod reestablishing communications with the second nodes of the first pod in which a communication connection was lost and the first nodes of the second pod reestablishing communications with the second nodes of the second pod in which a communication connection was lost during the fault condition: initiating, by the first nodes of the first pod, communication reconnection attempts with the second nodes of the second pod in which a communication connection was lost during the fault condition; and initiating, by the first nodes of the second pod, communication reconnection attempts with the second nodes of the first pod in which a communication connection was lost during the fault condition.

Clause 10. The network computing device of clause 9, wherein the first nodes of the first pod, the second nodes of the first pod, the first nodes of the second pod, and the second nodes of the second pod comprise a front end node or a back end node.

Clause 11. The network computing device of clause 9, wherein the operations further comprise: receiving a redesignation condition whereby at least one of the second nodes of the first pod or at least one of the second nodes of the second pod are redesignated from an attempt recipient to an attempt initiator.

Clause 12. The network computing device of clause 11, wherein the operations further comprise: initiating, by the at least one of the second nodes of the first pod or the at least one of the second nodes of the second pod redesignated from an attempt recipient to an attempt initiator, communication reconnection attempts with the second nodes of the first pod or the second nodes of the second pod in which a communication connection was lost.

Clause 13. The network computing device of clause 11, wherein the redesignation condition comprises a percent of communication connections between the first nodes of the first pod, the second nodes of the first pod, the first nodes of the second pod, and the second nodes of the second pod have been reestablished.

Clause 14. The network computing device of clause 11, wherein the redesignation condition comprises a number of communication connections between the first nodes of the first pod, the second nodes of the first pod, the first nodes of the second pod, and the second nodes of the second pod have been reestablished.

Clause 15. The network computing device of clause 11, wherein the redesignation condition comprises an elapsed period of time from a commencement of communication reconnection attempts between the first nodes of the first pod, the second nodes of the first pod, the first nodes of the second pod, or the second nodes of the second pod.

Clause 16. The network computing device of clause 9, wherein the first pod or the second pod comprises a virtual network function (VNF).

Clause 17. A non-transitory computer-readable media storing computer-executable instructions that, when executed by one or more processors, cause the one or more processors to perform operations comprising: designating, in a first pod of a user data repository (UDR) of a wireless communications network, first nodes of the first pod as attempt initiators and second nodes of the first pod as attempt receivers; designating, in a second pod of the UDR, first nodes of the second pod as attempt initiators and second nodes of the second pod as attempt receivers, wherein the first nodes of the first pod, the second nodes of the first pod, the first nodes of the second pod, and the second nodes of the second pod are in full communication; receiving, at the UDR, a fault condition indicating lost communication connections of a plurality of the first nodes of the first pod, a plurality of the second nodes of the first pod, a plurality of the first nodes of the second pod, and a plurality of the second nodes of the second pod; initiating, by the first nodes of the first pod, communication reconnection attempts with the second nodes of the first pod in which a communication connection was lost during the fault condition; initiating, by the first nodes of the second pod, communication reconnection attempts with the second nodes of the second pod in which a communication connection was lost during the fault condition; and upon the first nodes of the first pod reestablishing communications with the second nodes of the first pod in which a communication connection was lost and the first nodes of the second pod reestablishing communications with the second nodes of the second pod in which a communication connection was lost during the fault condition: initiating, by the first nodes of the first pod, communication reconnection attempts with the second nodes of the second pod in which a communication connection was lost during the fault condition; and initiating, by the first nodes of the second pod, communication reconnection attempts with the second nodes of the first pod in which a communication connection was lost during the fault condition.

Clause 18. The non-transitory computer-readable media of clause 17, wherein the first pod or the second pod comprises a virtual network function (VNF).

Clause 19. The non-transitory computer-readable media of clause 17, wherein the first nodes of the first pod, the second nodes of the first pod, the first nodes of the second pod, and the second nodes of the second pod comprise a front end node or a back end node.

Clause 20. The non-transitory computer-readable media of clause 17, wherein the operations further comprise: receiving a redesignation condition whereby at least one of the second nodes of the first pod or at least one of the second nodes of the second pod are redesignated from an attempt recipient to an attempt initiator; and initiating, by the at least one of the second nodes of the first pod or the at least one of the second nodes of the second pod redesignated from an attempt recipient to an attempt initiator, communication reconnection attempts with the second nodes of the first pod or the second nodes of the second pod in which a communication connection was lost, wherein the redesignation condition comprises: a percent of communication connections between the first nodes of the first pod, the second nodes of the first pod, the first nodes of the second pod, and the second nodes of the second pod have been reestablished; a number of communication connections between the first nodes of the first pod, the second nodes of the first pod, the first nodes of the second pod, and the second nodes of the second pod have been reestablished; or an elapsed period of time from a commencement of communication reconnection attempts between the first nodes of the first pod, the second nodes of the first pod, the first nodes of the second pod, or the second nodes of the second pod.

While the example clauses described above are described with respect to one particular implementation, it should be understood that, in the context of this document, the content of the example clauses can also be implemented via a method, device, system, computer-readable medium, and/or another implementation. Additionally, any of the examples A-S can be implemented alone or in combination with any other one or more of the examples A-S.

Conclusion

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," may, "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by one or more computing devices configured in a wireless communications network, the method comprising:

designating, in a first pod of a user data repository (UDR) of the wireless communications network, first nodes of the first pod as attempt initiators and second nodes of the first pod as attempt receivers;

designating, in a second pod of the UDR, first nodes of the second pod as attempt initiators and second nodes of the second pod as attempt receivers, wherein the first nodes of the first pod, the second nodes of the first pod, the first nodes of the second pod, and the second nodes of the second pod are in full communication;

receiving, at the UDR, a fault condition indicating lost communication connections of a plurality of the first nodes of the first pod, a plurality of the second nodes of the first pod, a plurality of the first nodes of the second pod, and a plurality of the second nodes of the second pod;

initiating, by the first nodes of the first pod, communication reconnection attempts with the second nodes of the first pod in which a communication connection was lost during the fault condition; and initiating, by the first nodes of the second pod, communication reconnection attempts with the second nodes of the second pod in which a communication connection was lost during the fault condition.

2. The method of claim 1, further comprising:

upon the first nodes of the first pod reestablishing communications with the second nodes of the first pod in which a communication connection was lost and the first nodes of the second pod reestablishing communications with the second nodes of the second pod in which a communication connection was lost during the fault condition:

initiating, by the first nodes of the first pod, communication reconnection attempts with the second nodes of the second pod in which a communication connection was lost during the fault condition; and initiating, by the first nodes of the second pod, communication reconnection attempts with the second nodes of the first pod in which a communication connection was lost during the fault condition.

3. The method of claim 1, further comprising receiving a redesignation condition whereby at least one of the second nodes of the first pod or at least one of the second nodes of the second pod are redesignated from an attempt recipient to an attempt initiator.

4. The method of claim 3, further comprising initiating, by the at least one of the second nodes of the first pod or the at least one of the second nodes of the second pod redesignated from an attempt recipient to an attempt initiator, communication reconnection attempts with the second nodes of the first pod or the second nodes of the second pod in which a communication connection was lost.

5. The method of claim 3, wherein the redesignation condition comprises a percent of communication connections between the first nodes of the first pod, the second nodes of the first pod, the first nodes of the second pod, and the second nodes of the second pod have been reestablished.

6. The method of claim 3, wherein the redesignation condition comprises a number of communication connections between the first nodes of the first pod, the second nodes of the first pod, the first nodes of the second pod, and the second nodes of the second pod have been reestablished.

7. The method of claim 3, wherein the redesignation condition comprises an elapsed period of time from a commencement of communication reconnection attempts between the first nodes of the first pod, the second nodes of the first pod, the first nodes of the second pod, or the second nodes of the second pod.

8. The method of claim 1, wherein the first pod or the second pod comprises a virtual network function (VNF).

9. A network computing device configured at a wireless communications network, the network computing device comprising:

one or more processors;

one or more transceivers; and non-transitory computer-readable media storing computer-executable instructions that, when executed by the one or more processors, cause the one or more processors to perform operations comprising:

designating, in a first pod of a user data repository (UDR) of the wireless communications network, first nodes of the first pod as attempt initiators and second nodes of the first pod as attempt receivers;

designating, in a second pod of the UDR, first nodes of the second pod as attempt initiators and second nodes of the second pod as attempt receivers, wherein the first nodes of the first pod, the second nodes of the first pod, the first nodes of the second pod, and the second nodes of the second pod are in full communication;

receiving, at the UDR, a fault condition indicating lost communication connections of a plurality of the first nodes of the first pod, a plurality of the second nodes of the first pod, a plurality of the first nodes of the second pod, and a plurality of the second nodes of the second pod;

initiating, by the first nodes of the first pod, communication reconnection attempts with the second nodes of the first pod in which a communication connection was lost during the fault condition;

initiating, by the first nodes of the second pod, communication reconnection attempts with the second nodes of the second pod in which a communication connection was lost during the fault condition; and upon the first nodes of the first pod reestablishing communications with the second nodes of the first pod in which a communication connection was lost and the first nodes of the second pod reestablishing communications with the second nodes of the second pod in which a communication connection was lost during the fault condition:

initiating, by the first nodes of the first pod, communication reconnection attempts with the second nodes of the second pod in which a communication connection was lost during the fault condition; and initiating, by the first nodes of the second pod, communication reconnection attempts with the second nodes of the first pod in which a communication connection was lost during the fault condition.

10. The network computing device of claim 9, wherein the first nodes of the first pod, the second nodes of the first pod, the first nodes of the second pod, and the second nodes of the second pod comprise a front end node or a back end node.

11. The network computing device of claim 9, wherein the operations further comprise: receiving a redesignation condition whereby at least one of the second nodes of the first pod or at least one of the second nodes of the second pod are redesignated from an attempt recipient to an attempt initiator.

12. The network computing device of claim 11, wherein the operations further comprise: initiating, by the at least one of the second nodes of the first pod or the at least one of the second nodes of the second pod redesignated from an attempt recipient to an attempt initiator, communication reconnection attempts with the second nodes of the first pod or the second nodes of the second pod in which a communication connection was lost.

13. The network computing device of claim 11, wherein the redesignation condition comprises a percent of communication connections between the first nodes of the first pod, the second nodes of the first pod, the first nodes of the second pod, and the second nodes of the second pod have been reestablished.

14. The network computing device of claim 11, wherein the redesignation condition comprises a number of communication connections between the first nodes of the first pod, the second nodes of the first pod, the first nodes of the second pod, and the second nodes of the second pod have been reestablished.

15. The network computing device of claim 11, wherein the redesignation condition comprises an elapsed period of time from a commencement of communication reconnection attempts between the first nodes of the first pod, the second nodes of the first pod, the first nodes of the second pod, or the second nodes of the second pod.

16. The network computing device of claim 9, wherein the first pod or the second pod comprises a virtual network function (VNF).

17. A non-transitory computer-readable media storing computer-executable instructions that, when executed by one or more processors, cause the one or more processors to perform operations comprising:

designating, in a first pod of a user data repository (UDR) of a wireless communications network, first nodes of the first pod as attempt initiators and second nodes of the first pod as attempt receivers;

designating, in a second pod of the UDR, first nodes of the second pod as attempt initiators and second nodes of the second pod as attempt receivers, wherein the first nodes of the first pod, the second nodes of the first pod, the first nodes of the second pod, and the second nodes of the second pod are in full communication;

receiving, at the UDR, a fault condition indicating lost communication connections of a plurality of the first nodes of the first pod, a plurality of the second nodes of the first pod, a plurality of the first nodes of the second pod, and a plurality of the second nodes of the second pod;

initiating, by the first nodes of the first pod, communication reconnection attempts with the second nodes of the first pod in which a communication connection was lost during the fault condition;

initiating, by the first nodes of the second pod, communication reconnection attempts with the second nodes of the second pod in which a communication connection was lost during the fault condition; and upon the first nodes of the first pod reestablishing communications with the second nodes of the first pod in which a communication connection was lost and the first nodes of the second pod reestablishing communications with the second nodes of the second pod in which a communication connection was lost during the fault condition:

initiating, by the first nodes of the first pod, communication reconnection attempts with the second nodes of the second pod in which a communication connection was lost during the fault condition; and initiating, by the first nodes of the second pod, communication reconnection attempts with the second nodes of the first pod in which a communication connection was lost during the fault condition.

18. The non-transitory computer-readable media of claim 17, wherein the first pod or the second pod comprises a virtual network function (VNF).

19. The non-transitory computer-readable media of claim 17, wherein the first nodes of the first pod, the second nodes of the first pod, the first nodes of the second pod, and the second nodes of the second pod comprise a front end node or a back end node.

20. The non-transitory computer-readable media of claim 17, wherein the operations further comprise:

receiving a redesignation condition whereby at least one of the second nodes of the first pod or at least one of the second nodes of the second pod are redesignated from an attempt recipient to an attempt initiator; and initiating, by the at least one of the second nodes of the first pod or the at least one of the second nodes of the second pod redesignated from an attempt recipient to an attempt initiator, communication reconnection attempts with the second nodes of the first pod or the second nodes of the second pod in which a communication connection was lost, wherein the redesignation condition comprises:

a percent of communication connections between the first nodes of the first pod, the second nodes of the first pod, the first nodes of the second pod, and the second nodes of the second pod have been reestablished;

a number of communication connections between the first nodes of the first pod, the second nodes of the first pod, the first nodes of the second pod, and the second nodes of the second pod have been reestablished; or an elapsed period of time from a commencement of communication reconnection attempts between the first nodes of the first pod, the second nodes of the first pod, the first nodes of the second pod, or the second nodes of the second pod.

* * * * *